(12) United States Patent
Prabhu et al.

(10) Patent No.: US 8,249,837 B1
(45) Date of Patent: Aug. 21, 2012

(54) METHOD FOR OPTIMIZATION OF SHEET METAL FORMING TOOL TOPOLOGY

(75) Inventors: Nishad S. Prabhu, Wichita, KS (US);
Aniruddha Deo, Wichita, KS (US);
Pravin Kulkarni, Wichita, KS (US);
Gregory Frye, Wichita, KS (US);
Shashikiran Prabhaker Mysur,
Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 444 days.

(21) Appl. No.: 12/510,843

(22) Filed: Jul. 28, 2009

(51) Int. Cl.
*G06F 17/50* (2006.01)
*G06F 17/10* (2006.01)

(52) U.S. Cl. .......................................................... 703/2

(58) Field of Classification Search .................... 703/1, 2
See application file for complete search history.

(56) References Cited

U.S. PATENT DOCUMENTS

| | | | |
|---|---|---|---|
| 6,917,700 B2 * | 7/2005 | Schuler et al. | 382/152 |
| 2004/0172224 A1 * | 9/2004 | Sadagopan et al. | 703/2 |
| 2008/0243442 A1 * | 10/2008 | Kubli et al. | 703/1 |

* cited by examiner

*Primary Examiner* — Dwin M Craig
*Assistant Examiner* — Andre Pierre Louis
(74) *Attorney, Agent, or Firm* — Lathrop & Gage LLP

(57) ABSTRACT

A method for determining an optimized structure for skin stretch form blocks. An optimized stretch form block design is generated by performing a finite element analysis on a stretch form block design selected from a target group of the stretch form blocks which have been classified into a plurality of groups based on similar topology of the blocks. The finite element analysis includes specifying a suggested design and generating the optimized stretch form block design by iteratively modifying the suggested design until the suggested design has a predetermined sufficient structural strength. An interpolation model is generated from the optimized stretch form block design, and an optimized stretch form block structure is determined for any stretch form block having size and weight parameters within an envelope defined by the target group of the stretch form blocks, by performing a weighted nearest neighbor interpolation using specified geometric parameters and material parameters.

20 Claims, 5 Drawing Sheets

METHOD FOR OPTIMIZATION OF SHEET METAL FORMING TOOL TOPOLOGY

BACKGROUND

Previously, the process of designing sheet metal forming tools/dies has required that a particular forming tool design be physically manufactured and tested before it is known whether the tool is suitable for forming the desired part. Furthermore, even when a particular tool is determined to be capable of forming the requisite part, the tool is often heavier and requires more material than an optimally-designed tool. What is needed is a process for designing sheet metal forming tools that provides a suitable result while minimizing the amount of material needed to construct the tool.

SUMMARY

The present method relates to sheet metal forming tools/dies & die set design, specifically for the topology/shape and/or size optimization of the forming tools.

Structural geometry of a die is modified to result in efficient layout of material to support the operating loads leading to reduction in the weight of die without compromising the structural rigidity. Operating loads are load-profiled using a sheet metal forming simulation. Topology optimization of the sheet metal forming process is accomplished using finite element analysis. An interpolation model is then generated. The interpolation model uses a 'nearest neighbor weighted interpolation' algorithm which is applied to topology optimization data derived from the simulations to generate optimized tool designs and design configurations.

DETAILED DESCRIPTION

The present method is applicable to forming tools/dies & die set design, specifically for the topology/shape and/or size optimization of forming tools. Structural geometry of a particular forming tool is optimized for efficient layout of material to support the external and internal loads leading to reduction in the weight of the tool without compromising its structural rigidity. The present method is particularly suitable for designing skin stretch form blocks for use in the manufacture of aircraft.

Figure 1A:
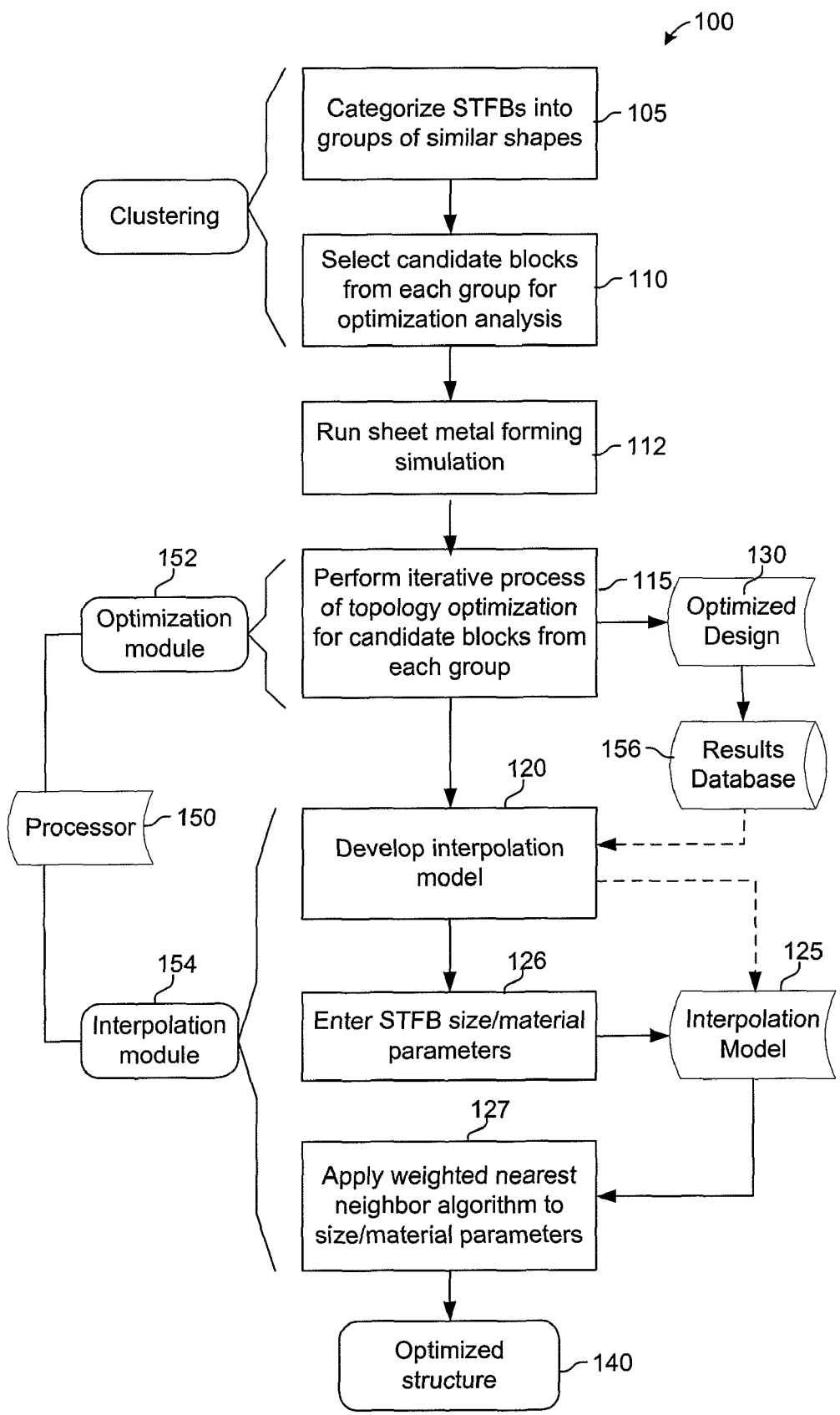
FIG. 1A is a flowchart showing an exemplary set of high-level steps performed in carrying out the present method.

FIG. 1A is a flowchart showing an exemplary set of high-level steps performed in carrying out the present method 100, which includes three stages—the clustering of stretch form block shapes, optimization of the topology of the blocks, and the use of interpolation to develop an optimized stretch form block structure. Topology optimization and interpolation processing is performed using a processor 150 respectively executing software program modules 152 and 154, the function of each of which is described below.

Clustering Procedure

Figure 1B:
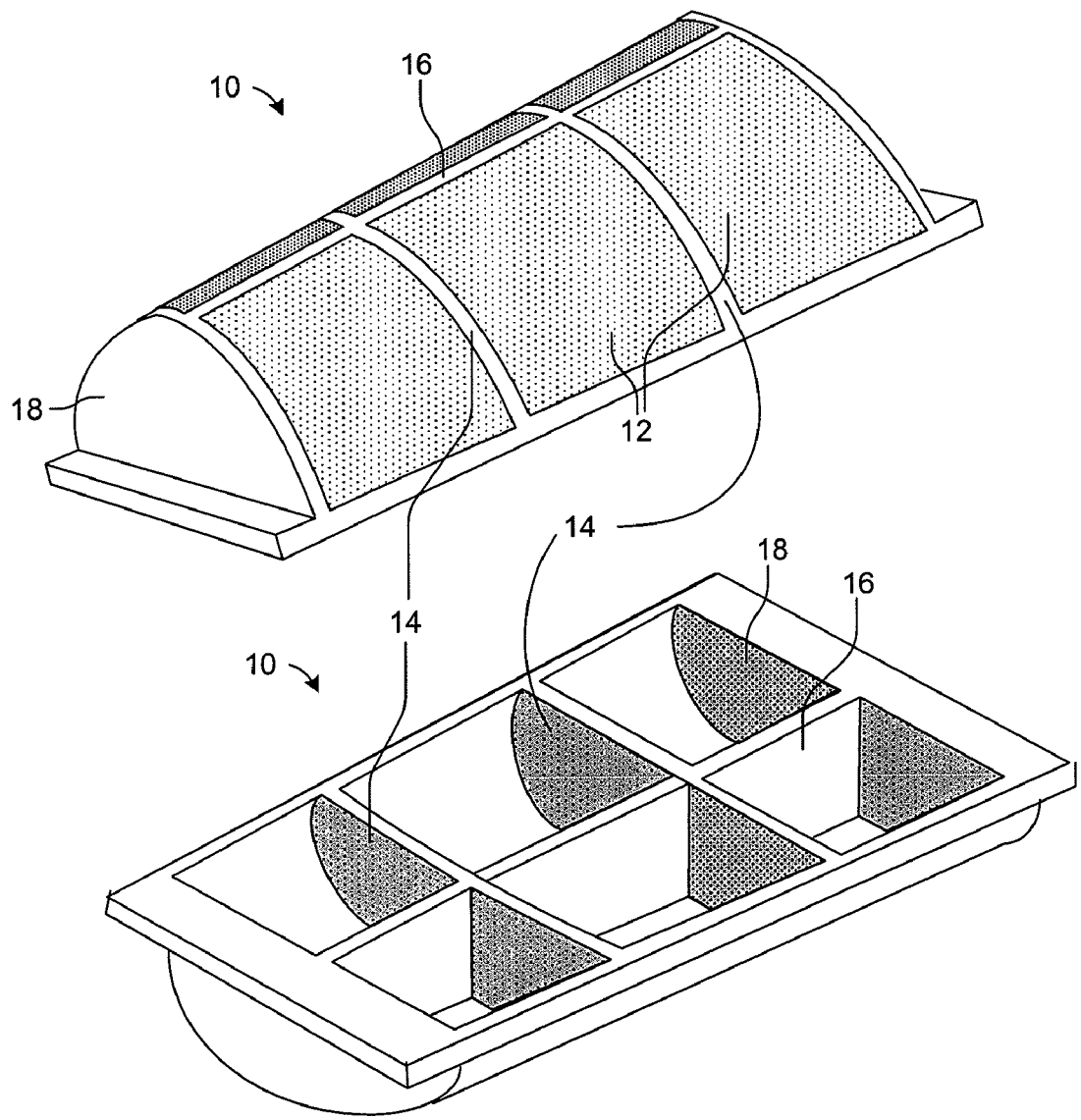
FIG. 1B is a diagram showing an exemplary stretch form block.

The geometry for a forming tool, or more specifically, a stretch form block (STFB), is typically a ribbed structure that is standardized for ease of manufacture. FIG. 1B is a diagram showing bottom and top views of an exemplary stretch form block 10. As shown in FIG. 1B, STFB 10 includes lateral ribs 14 and longitudinal ribs 16, outer shell 12, and end caps 18.

As shown in FIG. 1A, at step 105, a manual clustering procedure is initially used to classify stretch form blocks 10 from different aircraft into groups based on topology or shape. This clustering reduces the number of simulations required to collect data and exploit the inherent scalability in the design of an aircraft.

Images of the STFBs for a given aircraft are arranged both horizontally and vertically in a 'similarity matrix', and are then rated against each other for similarity on a scale of 0, 1, 3, 7, and 10, where '0' is absolutely different and '10' is identical; and where '1', '3', and '7' indicate progressive levels of similarity. The classification of the forming tools (STFBs) into groups is based entirely on shape, and is determined by manual estimation The STFBs with the highest relative similarity ratings are grouped together with each other in respective groups. Once the STFBs are grouped together, the STFBs with the maximum and minimum weights (and in some larger groups the STFB in the middle, as well) are selected as candidate STFBs for analysis, at step 110. The clustering procedure aids in categorizing the STFBs into different groups, and also helps reduce the number of simulations required. This clustering procedure may also be used to combine groups of STFBs from different sizes and types of aircraft.

At step 112, a sheet metal forming simulation is run, using a commercially available software module, e.g., LS-DYNA, developed by Livermore Software Technology Corporation. The sheet metal forming simulation predicts stresses, deformations, and structural failures in the candidate STFBs selected in step 110. After simulations are run for the skin stretch forming process, the loading conditions are transferred to (load-mapped via) a software module which performs topology optimization, as described below.

Methodology to Optimize STFB Topology

Next, topology optimization is performed on the candidate tools selected in step 110 and simulated in step 112, using an iteratively designed structural shape within a pre-defined space (described in detail below with respect to FIG. 3), at step 115. Topology optimization is a structural analysis method for designing a rigid structure with an optimum material distribution in a given design space. Each data point for this optimization methodology is generated by a finite element analysis (FEM) technique for which a commercially available software module 152, e.g., Altair Optistruct, is executed on processor 150. The analysis/optimization includes geometric parameters such as length, width and height of the tool, forming blank material parameters such as material type and temper, as well as process parameters and loading/operating conditions.

In generating the iteratively designed structural shape for the STFB, a system user first provides structural supports and loads, and the finite element analysis module 152 then forms the structural shape to provide an initial design having an efficient geometry. The FEM module 152 then performs a simulation in which the geometry for each STFB is iteratively re-designed to create an optimized ribbed structure, such as STFB 10 (shown in FIG. 1B) that is standardized for ease of manufacture. Data representing the optimized design 130 is stored in a results database 156, and used in the interpolation process described further below with respect to FIG. 4. At step 120, an interpolation model 125 is generated by interpolation module 154. At step 126, size and material parameters for a target STFB are input to interpolation module 154, which applies a 'nearest neighbor weighted interpolation' algorithm (described below) to topology optimization data stored in the results database 156, at step 127, to generate an interpolated optimized STFB design 140 that conforms to a set of desired parameters.

DEFINITIONS

Solid design: the initial solid tool (STFB) without any cavities.

Design space: initially, the space occupied by the solid tool minus the initial design. Material is removed from the design space in subsequent design iterations.

Suggested design space: the space occupied by each successive suggested design.

The initial design initially occupies the suggested design space, to which material is added in subsequent design iterations. The initial design is such that it, as well as subsequent suggested designs, can be efficiently scaled for interpolation. The initial design and subsequent suggested designs are determined from a combination of features including ribs in longitudinal and lateral directions, outer shell, and end caps.

Figure 2:
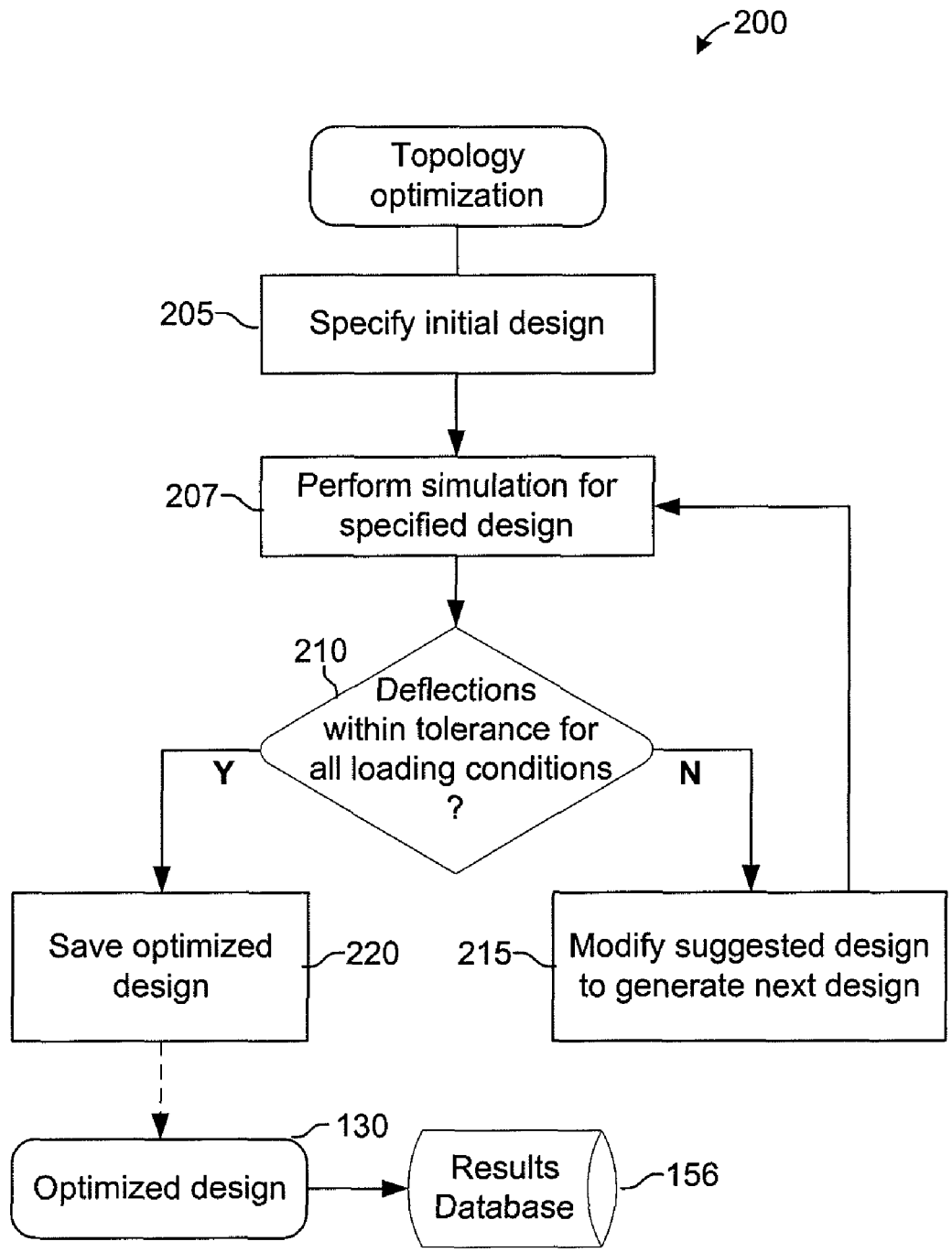
FIG. 2 is a flowchart showing an exemplary set of steps performed in optimizing the topology of a particular stretch form block.

FIG. 2 is a flowchart showing an exemplary set of steps 200 performed in optimizing the topology of a particular stretch form block. As shown in FIG. 2, the solid design is specified, along with an initial specification of the suggested design at step 205, and submitted to the finite element analysis simulation program at step 207.

Figure 3:
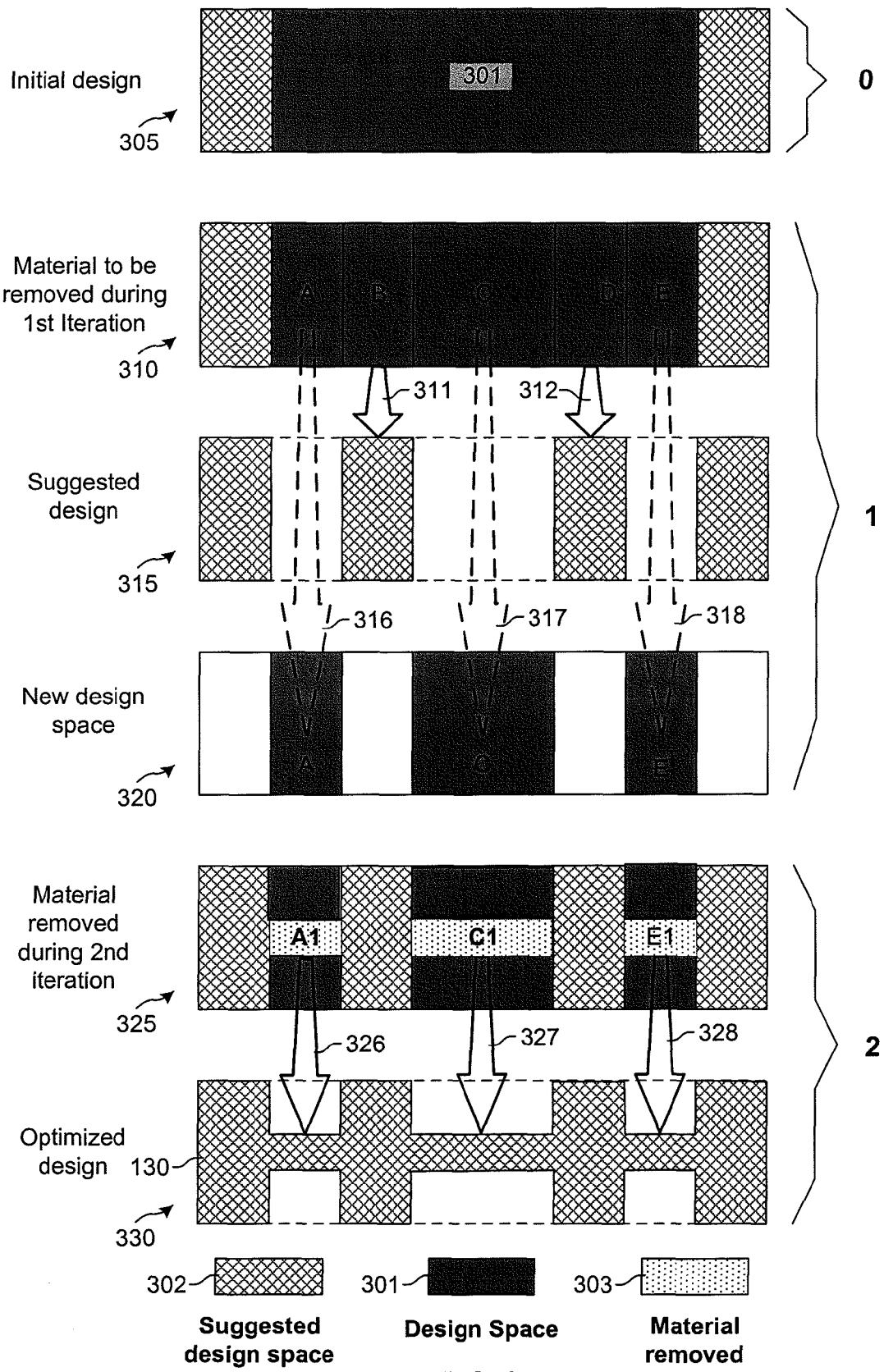
FIG. 3 is a diagram showing exemplary set of steps performed in the topology optimization process.

FIG. 3 is a diagram showing exemplary set of steps performed by the simulation program in the stretch form block topology optimization process. Operation of the present method is best understood by viewing FIGS. 2 and 3 in conjunction with one another. As shown in FIG. 3, during the design optimization process, material is removed from the design space 301 and added to the suggested design space 302 to generate a suggested STFB design, with an attempt being made to minimize the weight of the resultant design while providing the required structural strength. The process is thus driven by the load borne by the suggested design.

Specific design criteria include the requirement that the design be easy to manufacture, e.g., by using a standardized structure consisting of ribs/shell/end caps, and the design parameters should be capable of being straightforwardly interpolated to new STFBs. To meet this criteria the final design should include a combination of the features mentioned above, specifically, lateral and longitudinal ribs 14/16, an outer shell 12, and end caps 18. In order to drive the design towards such a structure, each suggested design includes similar features.

During the iterative topology optimization process the suggested design space for each iteration is determined based on the results from the previous iteration. The finite element analysis module 152 indicates locations where material which needs to be added to the suggested design, such that a minimum weight is achieved while maintaining the necessary structural strength. FIG. 3 shows an initial design (indicated by brace '0') and two iterations of the design/optimization process, as respectively indicated by braces '1' and '2'. Block 305 shows the initial suggested design in suggested design space 302, indicated by the two cross-hatched areas at opposite ends of the block, and design space 301, which is mutually exclusive with the suggested design space 302.

As shown in FIG. 2 in step 207, the suggested design is analyzed by the finite element analysis simulation module 152, and in step 210, a determination is made as to whether the suggested design for the STFB has sufficient structural strength. In an exemplary embodiment, this is accomplished by simulating deflections resulting from STFB transportation and forming forces applied in circumstances including (a) transportation of the STFB by a fork lift, (b) lifting of the STFB by a crane for mounting the STFB on a press, and (c) the forming load applied over the entire forming surface (shell) during the forming process. If the simulated deflections are determined to be within predetermined limits, the STFB is deemed to have the necessary structural strength.

In the present example shown in FIG. 3, the initial design shown in block 305 lacks the required structural strength, thus, at step 215, the finite element analysis module 152 indicates locations where material which needs to be removed from design space 301 and added to the suggested design space to generate the next suggested design. Block 310 shows design space 301, divided into blocks A-E at the beginning of the first design/optimization process iteration.

Block 315 shows the suggested design resulting from the first optimization iteration, wherein design space portions B and D are moved to suggested design space 302, as indicated by arrows 311 and 312, to generate a new suggested design. Portions A, C, and E remain in design space 301, as shown in block 320, and indicated by dashed arrows 316-318. As shown in FIG. 2, in step 207 the present suggested design for the STFB (shown in block 315 of FIG. 3) is again analyzed by simulation module 152, and in step 210 it is determined that the suggested design still does not have suitable structural strength. Therefore, in the present example, step 215 is again executed in an attempt to provide a suitably strong STFB.

Block 325 shows the material 303 (indicated by portions A1, C1, and E1) removed from sections A, C, and E of design space 301 in the second optimization iteration. The material 303 thus removed is transferred (as shown by arrows 326, 327, and 328) to the suggested design space 302 to generate a new suggested design, as indicated in block 330.

At step 207 (FIG. 2), another simulation of the new suggested design (in block 330) is performed, and a determination is made as to whether the suggested design for the STFB has suitable structural strength, at step 210. As the suggested design is changed, a stage is reached where the suggested design has sufficient structural strength and no additional material is added to the suggested design space. In the present example, the new suggested design meets the structural criteria, and is therefore determined to be the final, optimized design 130. The optimized design 130 is then saved in the results database 156 at step 220.

Interpolation

Figure 4:
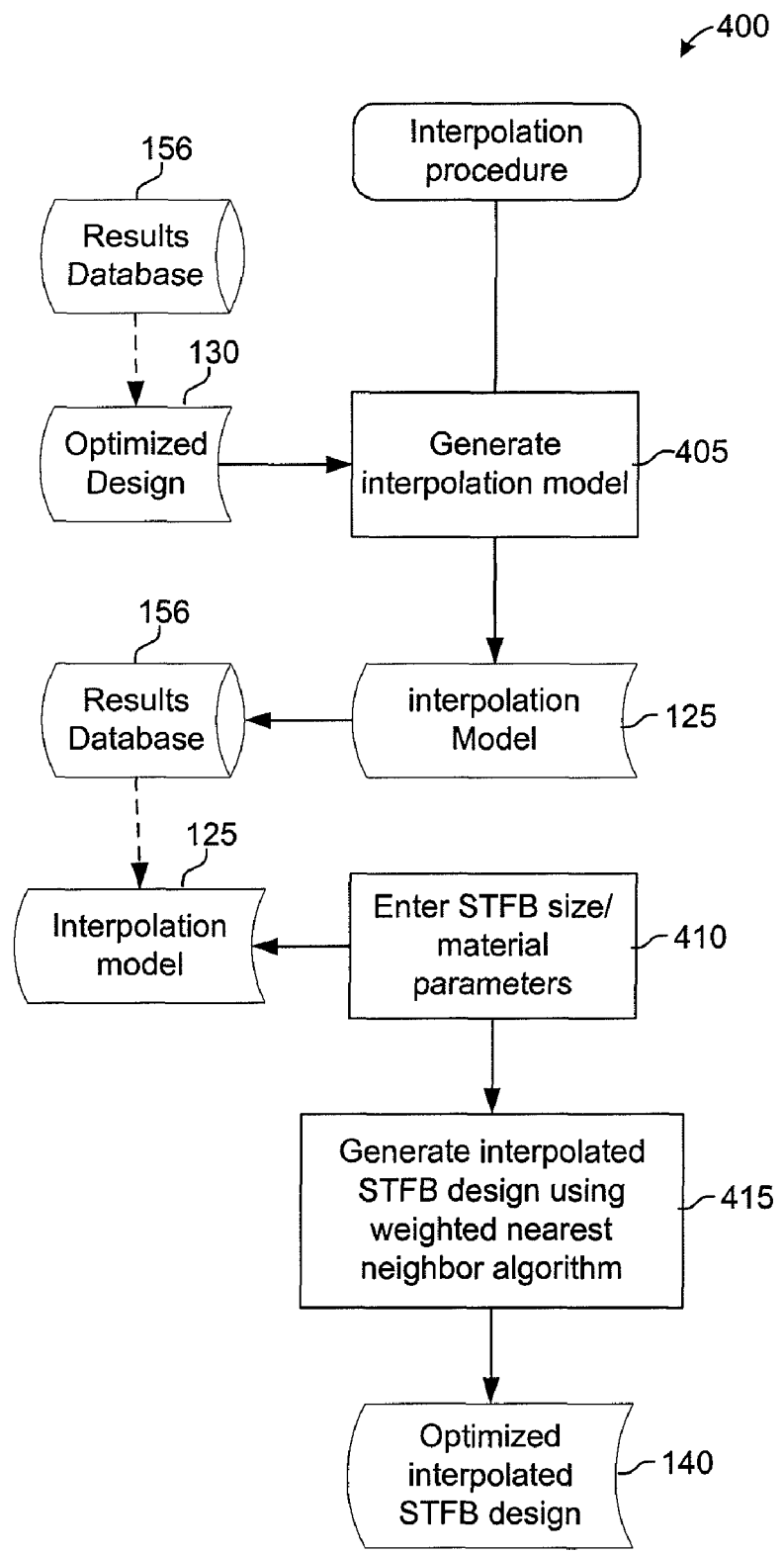
FIG. 4 is a flowchart showing an exemplary set of steps performed in an interpolation process.

FIG. 4 is a flowchart showing an exemplary set of steps performed in the present interpolation process 400. This interpolation process facilitates interpolation between STFBs of various dimensions for the desired purpose of exploiting the inherent scalability in aircraft design. An optimized rib structure is determined for any STFB having size and weight parameters within an envelope defined by a group of the stretch form blocks selected from the groups determined in step 105 of FIG. 1B.

As shown in FIG. 4, at step 405, an interpolation model 125 is generated to facilitate determining an optimized rib structure for any stretch form block having size and weight parameters within an envelope defined by a candidate group of stretch form blocks selected in step 110 (FIG. 1A). At step 410, size and material parameters for a desired STFB are entered into the interpolation model 125. At step 415, interpolation model 125 generates the interpolated optimized STFB design 140, by applying a 'nearest neighbor weighted interpolation' algorithm (described below) to topology optimization data for the optimized design 130 stored in the results database 156.

In the interpolation process, a given design is scaled for interpolation so that the design parameters can be interpolated to new STFBs for the purpose of facilitating manufacturability of STFBs with different characteristics; i.e., STFBs of differing sizes and/or material types.

The 'nearest neighbor interpolation' algorithm (also known as the 'inverse distance method') is a simple machine learning method that smoothly approximates values on a multi-dimensional surface given a collection of randomly distributed or irregularly spaced samples. The algorithm is used to estimate the height z, given a position on the plane (x,y). Consider N samples, that is, N triples (xi, yi, zi). The general form of the 'nearest neighbor interpolation' algorithm for estimating z is given by the following:

$$Y_{k*} = \begin{cases} \dfrac{\sum\limits_{j=1}^{n} \dfrac{Y_{kj}}{\left(\sum\limits_{i=1}^{m} (X_{ij} - X_{i*})^{P_2}\right)^{\frac{P_1}{2}}}}{\sum\limits_{j=1}^{n} \dfrac{1}{\left(\sum\limits_{i=1}^{m} (X_{ij} - X_{i*})^{P_2}\right)^{\frac{P_1}{2}}}} \forall\, X_{ij} \neq X_{i*},\, i \equiv (1, 2, \ldots, m), \\ j \equiv (1, 2, \ldots, n), k \equiv (1, 2, 3, 4) \\ X_{ij} \forall\, X_{ij} = X_{i*}, i \equiv (1, 2, \ldots, m), j \equiv (1, 2, \ldots, n), k \equiv (1, 2, 3, 4) \end{cases}$$

The weight 'P1' can be used to set the relative contribution of the sample space. In general, the value of 'P1' is chosen such that a sample close in proximity has a greater influence on the estimate than a more distant sample. For Euclidean spaces a value of P1=1 should prove sufficiently accurate results in most cases. The value of 'P2' depends on the properties of the n-dimensional space. For Euclidean distances P2=2, where, 'm' is the number of dimensions and 'n' the number of samples. Note that the denominator above gives a measure of how close the point being estimated is from the samples.

In an exemplary embodiment, for each interpolated STFB design to be generated, there are 6 input parameters and 7 output parameters for the interpolation process. These input parameters include part (STFB) material, part thickness, solid tool weight, and Bounding box (STFB) length, width and height. The input parameters are dependent on the design of the part to be fabricated, and are known parameters for the simulated blocks as well as for new blocks. In an exemplary embodiment, the output parameters include STFB shell thickness, number of lateral ribs, number of longitudinal ribs, lateral rib thickness, longitudinal rib thickness, end cap thickness, and estimated hollow tool weight. Table 1 below shows an exemplary set of independent input design parameters.

TABLE 1

| Input parameters | |
| --- | --- |
| Term | Design Characteristic |
| $X_1$ | Part material |
| $X_2$ | Part thickness |
| $X_3$ | Solid tool weight |
| $X_4$ | Bounding box length |
| $X_5$ | Bounding box width |
| $X_6$ | Bounding box height |

Table 2 below shows an exemplary set of output parameters which are obtained from the simulation results.

TABLE 2

| Output parameters | |
| --- | --- |
| Term | Design Characteristic |
| $Y_1$ | Shell thickness |
| $Y_2$ | No. of lateral ribs |
| $Y_3$ | No. of longitudinal ribs |
| $Y_4$ | Lateral rib thickness |
| $Y_5$ | Longitudinal rib thickness |
| $Y_6$ | End cap thickness |
| $Y_7$ | Estimated hollow tool weight |

Using the 'nearest neighbor weighted interpolation' method, the output parameters may be interpolated for new STFBs, via interpolation model 125. The following parameters are interpolated:

the input parameters that are known for the new STFBs the input parameters for the candidate STFBs that have been optimized the output parameters for the candidate STFBs that have been optimized In the following example shown in Tables 3, 4, and 5 below, it is presumed that values for STFB 1 to STFB n have already been determined. Thus the input parameters are known, as well as the output parameters for these previous STFBs. In this example, the new STFB to be designed is designated as STFB*. The input parameters for STFB* are known. The seven output parameters for STFB* are determined using the above-described 'nearest neighbor weighted interpolation' technique and the data for STFBs 1 to n.

TABLE 3

| predetermined input parameters for each STFB | | | | | | |
| --- | --- | --- | --- | --- | --- | --- |
| Xij | X1 | X2 | X3 | X4 | X5 | X6 |
| Stretch block1 | X11 | X21 | X31 | X41 | X51 | X61 |
| Stretch block2 | X12 | X22 | X32 | X42 | X52 | X62 |
| ... | | | | | | |
| Stretch block n | X1n | X2n | X3n | X4n | X5n | X6n |

Output parameters for blocks up to stretch block n are known, whereas those for STFB* are determined using the 'nearest neighbor weighted interpolation described above. The results of the interpolation process are shown below in Table 4.

TABLE 4

| output parameters | | | | | | | |
| --- | --- | --- | --- | --- | --- | --- | --- |
| Ykj | Y1 | Y2 | Y3 | Y4 | Y5 | Y6 | Y7 |
| Stretch block1 | Y11 | Y21 | Y31 | Y41 | Y51 | Y61 | Y71 |
| Stretch block2 | Y12 | Y22 | Y32 | Y42 | Y52 | Y62 | Y72 |
| Stretch block n | Y1n | Y2n | Y3n | Y4n | Y5n | Y6n | Y7n |

Using the 'nearest neighbor' interpolation algorithm, the output parameters shown in Table 5, below, are calculated for STFB* based on the group to which the STFB belongs. These parameters correspond to parameters $Y_1$-$Y_7$ in Table 2, above.

TABLE 5

| calculated output parameters | | | | | | |
|---|---|---|---|---|---|---|
| Y1* | Y2* | Y3* | Y4* | Y5* | Y6* | Y7* |

What is claimed is:

1. A method for determining an optimized structure for skin stretch form blocks comprising:
generating an optimized stretch form block design by performing a finite element analysis on at least one said stretch form block design selected from a target group of the stretch form blocks which have been classified into a plurality of said groups based on similar topology of the blocks;
wherein the finite element analysis includes:
specifying a suggested design; and
generating the optimized stretch form block design by iteratively modifying the suggested design until the suggested design has a predetermined sufficient structural strength;
generating an interpolation model for the target group of stretch form blocks from the optimized stretch form block design; and
determining an optimized stretch form block structure for any said stretch form block having size and weight parameters within an envelope defined by said target group of the stretch form blocks, by performing a weighted nearest neighbor interpolation by applying specified geometric parameters and material parameters to the interpolation model.

2. The method of claim 1, wherein the optimized stretch form block design is determined from a combination of features including ribs in longitudinal and lateral directions, outer shell/forming surface, and end caps.

3. The method of claim 1, wherein the finite element analysis includes simulating:
deflections resulting from stretch form block transportation and forming forces applied in circumstances including transportation of the stretch form block by a fork lift, lifting of the stretch form block by a crane for mounting the stretch form block on a press, and
a forming load applied over a forming surface of the stretch form block during a forming process.

4. The method of claim 1, wherein the interpolation model optimizes the stretch form block structure with respect to specified parameters including material type and geometric parameters including length, width, and height.

5. The method of claim 1, wherein generating the optimized stretch form block design includes:
(a) generating an initial solid design in a design space;
(b) generating a suggested design in a suggested design space, by removing material from the design space and adding the removed material to the suggested design space;
(c) performing said finite element analysis on the suggested design in the suggested design space, to determine whether the suggested design has sufficient structural strength; and
(d) repeating steps (b)-(d) until the suggested design is determined to have the sufficient structural strength.

6. The method of claim 5, wherein, in step (b), geometry of the suggested design is modified to create a ribbed stretch form block structure.

7. A method for determining an optimized structure for a skin stretch form block comprising:
performing finite element analysis on an initial stretch form block design to generate an optimized design which takes into account process parameters including stretch form block loading and forming conditions;
generating an interpolation model based on the optimized design determined by the finite element analysis; and
determining an optimized rib structure in accordance with said optimized design which conforms to specified geometric parameters and material parameters, by performing a weighted nearest neighbor interpolation using the interpolation model in conjunction with specified said geometric parameters and said material parameters.

8. The method of claim 7, wherein the finite element analysis includes simulating:
deflections resulting from stretch form block transportation and forming forces applied in circumstances including transportation of the stretch form block by a fork lift, lifting of the stretch form block by a crane for mounting the stretch form block on a press, and
a forming load applied over a forming surface of the stretch form block during a forming process.

9. The method of claim 7, wherein the optimized rib structure is determined using input parameters including stretch form block material, thickness, solid tool weight, and length, width and height, and output parameters include stretch form block shell thickness, number of lateral and longitudinal ribs, lateral and longitudinal rib thickness, end cap thickness, and estimated hollow stretch form block weight.

10. The method of claim 7, wherein the geometric parameters include length, width, and height of the stretch form block, and wherein the material parameters include stretch form block material, temper, and thickness.

11. The method of claim 7, wherein the finite element analysis includes:
(a) generating the initial stretch form block design as a solid design in a design space;
(b) generating a suggested design in a suggested design space, by removing material from the design space and adding the removed material to the suggested design space;
(c) performing said finite element analysis on the suggested design in the suggested design space, to determine whether the suggested design has sufficient structural strength; and
(d) repeating steps (b)-(d) until the suggested design is determined to have the sufficient structural strength.

12. The method of claim 11, wherein, in step (b), geometry of the suggested design is modified to create a ribbed stretch form block structure.

13. The method of claim 11, wherein the suggested design is determined from a combination of features including ribs in longitudinal and lateral directions, outer shell/forming surface, and end caps.

14. A method for designing a skin stretch form block comprising:
(a) dividing an initial design for said stretch form block into solid sections which together constitute a suggested design space including a suggested design for the stretch form block, and a separate design space; determining an optimized stretch form block structure for any said stretch form block having size and weight parameters within an envelope defined by said target group of the stretch form blocks, by performing a weighted nearest neighbor interpolation by applying specified geometric parameters and material parameters to and interpolation model generated from an optimized form block design;

(b) performing a finite element analysis simulation to analyze the suggested design by simulating deflections resulting from stretch form block transportation and forming forces to determine whether the suggested design has suitable structural strength;

if the suggested design does not have suitable structural strength, then:

(c) using the results of the finite element analysis simulation to determine locations where material which needs to be removed from the design space and added to the suggested design space;

(d) removing the material from the design space and adding the material to the suggested design space, as determined in step (c), to generate a modified suggested design; and (e) repeating steps (b)-(d) until the modified suggested design in the design space has said suitable structural strength.

15. The method of claim 14, including determining an optimized rib structure for said stretch form block by performing a weighted nearest neighbor interpolation which takes into account geometric parameters, material parameters, and process parameters.

16. The method of claim 15, wherein the weighted nearest neighbor interpolation is performed using dimensions and weight of the stretch form block as inputs to determine an optimized structure for the stretch form block including shell thickness, number of lateral ribs, thickness of the lateral ribs, number of longitudinal ribs, thickness of the longitudinal ribs and thickness of end caps for the stretch form block.

17. The method of claim 14, wherein the modified suggested design is determined from a combination of features including ribs in longitudinal and lateral directions, outer shell/forming surface, and end caps.

18. The method of claim 14, wherein step (b) includes simulating:

said deflections resulting from transportation of the stretch form block;

forming forces applied in transportation and lifting of the stretch form block; and a forming load applied over the stretch form block outer shell during a forming process.

19. The method of claim 14, wherein step (c) includes analysis of geometric parameters including length, width and height of each said stretch form block, stretch form block material parameters including material type and temper, and stretch form block process parameters including loading and operating conditions.

20. The method of claim 14, wherein, in step (d), geometry of the suggested design is modified to create a ribbed stretch form block structure.

* * * * *